UNITED STATES PATENT OFFICE.

AMANDA ELLEN SHEARER, OF HUMPHREYS, ASSIGNOR OF ONE-HALF TO ISAAC RICHARD MARION BEESON, OF MILAN, MISSOURI.

GEM-TYPE FIXER.

SPECIFICATION forming part of Letters Patent No. 333,684, dated January 5, 1886.

Application filed June 23, 1885. Serial No. 169,534. (No specimens.)

*To all whom it may concern:*

Be it known that I, AMANDA ELLEN SHEARER, a citizen of the United States, residing at Humphreys, in the county of Sullivan and State of Missouri, have invented certain new and useful Improvements in Gem-Type Fixers; and I do declare the following to be a full, clear, and exact description of the invention, such as will enable others skilled in the art to which it appertains to make and use the same.

This invention has relation to compounds for fixing that class of pictures known as "gem" or "tin" types.

It consists in certain novel features hereinafter described and claimed.

My compound is composed of the following ingredients, used in the stated proportions, viz: carbonate of ammonia, thirty grains; alum, thirty grains; hyposulphite of soda, eight ounces; aqua-ammonia, six drops; water, eight ounces.

In preparing the compound I dissolve the hyposulphite of soda in the water, making a saturated solution. I then pulverize the alum and add it to the solution of hyposulphite of soda. The carbonate of ammonia is then added, and then, after the effervescing ceases, the aqua-ammonia is added. This process forms a compound from the use of which the best results are obtained. The hyposulphite of soda cleans the plate. The alum hardens the film, thereby preventing the appearance of silver streaks or the backward flow of silver, imparts tone to the picture, and settles the sulphur and sulphuric acid in the hyposulphite of soda. The carbonate of ammonia neutralizes the effect, and makes the high light clear and bright. The aqua-ammonia imparts a bluish tint, and brings out the shadows prominently, thereby adding very materially to the finish of the pictures.

My method of applying the fixer to the types or pictures is as follows: First, I pour the fixer into a shallow dish; second, place the picture or tin-type in the dish; third, hold the picture between thumb and finger; fourth, gently raise the picture up and down until the white film disappears, when the picture is fixed; fifth, then wash the picture thoroughly under the tap with pure water, which completes the process.

Having thus described my invention, what I claim, and desire to secure by Letters Patent, is—

The herein-described compound for fixing gem types or pictures, consisting of carbonate of ammonia, alum, hyposulphite of soda, aqua-ammonia, and water, combined in substantially the proportions stated, and for the purposes set forth.

In testimony whereof I affix my signature in presence of two witnesses.

AMANDA ELLEN SHEARER.

Witnesses:
J. W. ST. CLAIR,
L. DELL.